(12) United States Patent
Depew et al.

(10) Patent No.: US 10,114,988 B2
(45) Date of Patent: Oct. 30, 2018

(54) TRACKING DEVICE WIRELESS PRECONFIGURATION

(71) Applicant: Tile, Inc., San Mateo, CA (US)

(72) Inventors: John Mathew Depew, Sunnyvale, CA (US); Michael George Farley, San Mateo, CA (US)

(73) Assignee: Tile, Inc., San Mateo, CA (US)

( * ) Notice: Subject to any disclaimer, the term of this patent is extended or adjusted under 35 U.S.C. 154(b) by 5 days.

(21) Appl. No.: 15/467,199

(22) Filed: Mar. 23, 2017

(65) Prior Publication Data

US 2018/0276427 A1    Sep. 27, 2018

(51) Int. Cl.
| | | |
|---|---|---|
| G08B 29/00 | (2006.01) |
| G06K 7/10 | (2006.01) |
| G06K 7/00 | (2006.01) |
| H04L 29/08 | (2006.01) |

(52) U.S. Cl.
CPC ....... *G06K 7/10227* (2013.01); *G06K 7/0095* (2013.01); *H04L 67/306* (2013.01)

(58) Field of Classification Search
None
See application file for complete search history.

(56) References Cited

U.S. PATENT DOCUMENTS

| 7,848,905 | B2* | 12/2010 | Troxler | A01K 15/023 340/870.07 |
| 8,902,059 | B2* | 12/2014 | Mahmoud | G06Q 10/08 340/539.1 |
| 2003/0050038 | A1* | 3/2003 | Haave | B60R 25/102 455/404.1 |
| 2017/0373526 | A1* | 12/2017 | Huang | H02J 7/345 |

* cited by examiner

*Primary Examiner* — Adolf Dsouza
(74) *Attorney, Agent, or Firm* — Fenwick & West LLP

(57) ABSTRACT

A preconfiguration system preconfigures tracking devices before they are received by a user of the tracking devices. The preconfiguration system generates an activation signal that can be detected by an activation signal detector on a tracking device. Upon detecting the activation signal, the tracking device begins to operate in a preconfiguration mode and establishes a communicative connection with the preconfiguration system. The preconfiguration system can then communicate with the tracking device to perform a variety of tasks, including receiving a tracking device identifier from the tracking device so that the tracking device identifier can be associated with the user identifier for the user who purchased the tracking device.

26 Claims, 7 Drawing Sheets

TRACKING DEVICE WIRELESS PRECONFIGURATION

BACKGROUND

This disclosure relates generally to tracking devices, and more specifically, to the wireless configuration of tracking devices.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object (e.g., if it becomes lost).

Tracking devices can be associated with a user's account, for instance in response to the manual configuration of the tracking device by the user. The configuration process can be time consuming, and can require troubleshooting by the user. Accordingly, there is a need for a tracking device that can be preconfigured, for instance before the tracking device has been sent to the user by a seller or manufacturer.

SUMMARY

A preconfiguration system configures a tracking device in advance of receipt by an owner of the tracking device. The preconfiguration system receives a user identifier for an owner of the tracking device. The preconfiguration system generates a wireless activation signal in proximity to the tracking device. The tracking device includes an activation signal detector coupled to a controller, and the controller configures the tracking device from a sleep mode to a preconfiguration mode when the activation signal detector detects the activation signal. For example, the activation signal detector may be a hall effect sensor, and the wireless activation signal may be a magnetic field.

While operating in the preconfiguration mode, the tracking device establishes a communicative connection with the preconfiguration system and sends a tracking device identifier to the preconfiguration system. The preconfiguration system provides the tracking device identifier and the user identifier to a central tracking system, and the central tracking system associates the tracking device identifier with the user identifier. This preconfiguration process can be performed before the tracking device has been sent to the user, for instance at a manufacturing or retail facility while the tracking device is in factory-sealed packaging, preventing the necessity of the user performing a manual configuration process after receiving the tracking device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
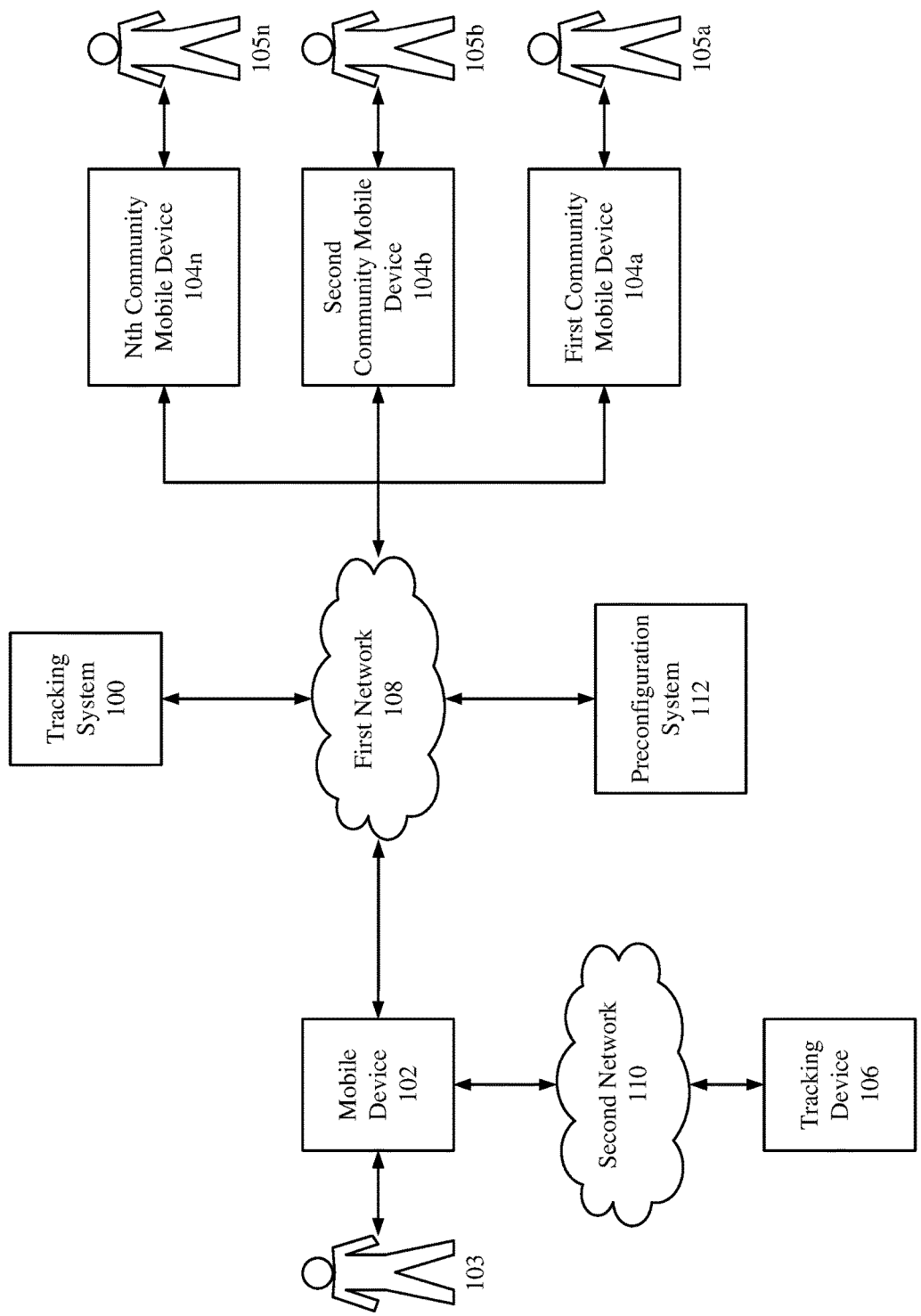
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. The tracking system 100 is also communicatively coupled to a preconfiguration system 112, the functionality of which will be explained in further detail below. Although FIG. 1 illustrates a particular arrangement of the tracking system 100, mobile device 102, community mobile devices 104, tracking device 106, and preconfiguration system 112, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

Tracking System Overview

Figure 2:
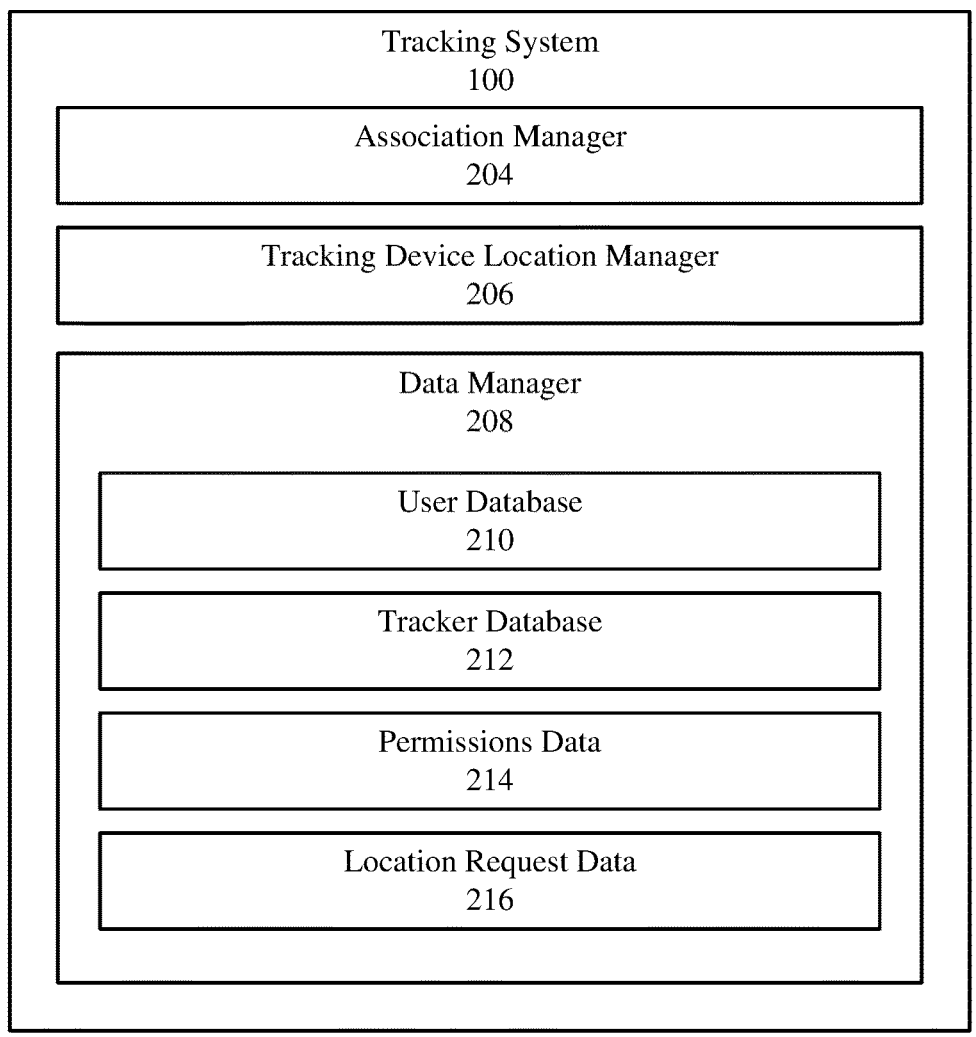
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102 or a preconfiguration system 112, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via a user input on the mobile device 102. In another embodiment, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
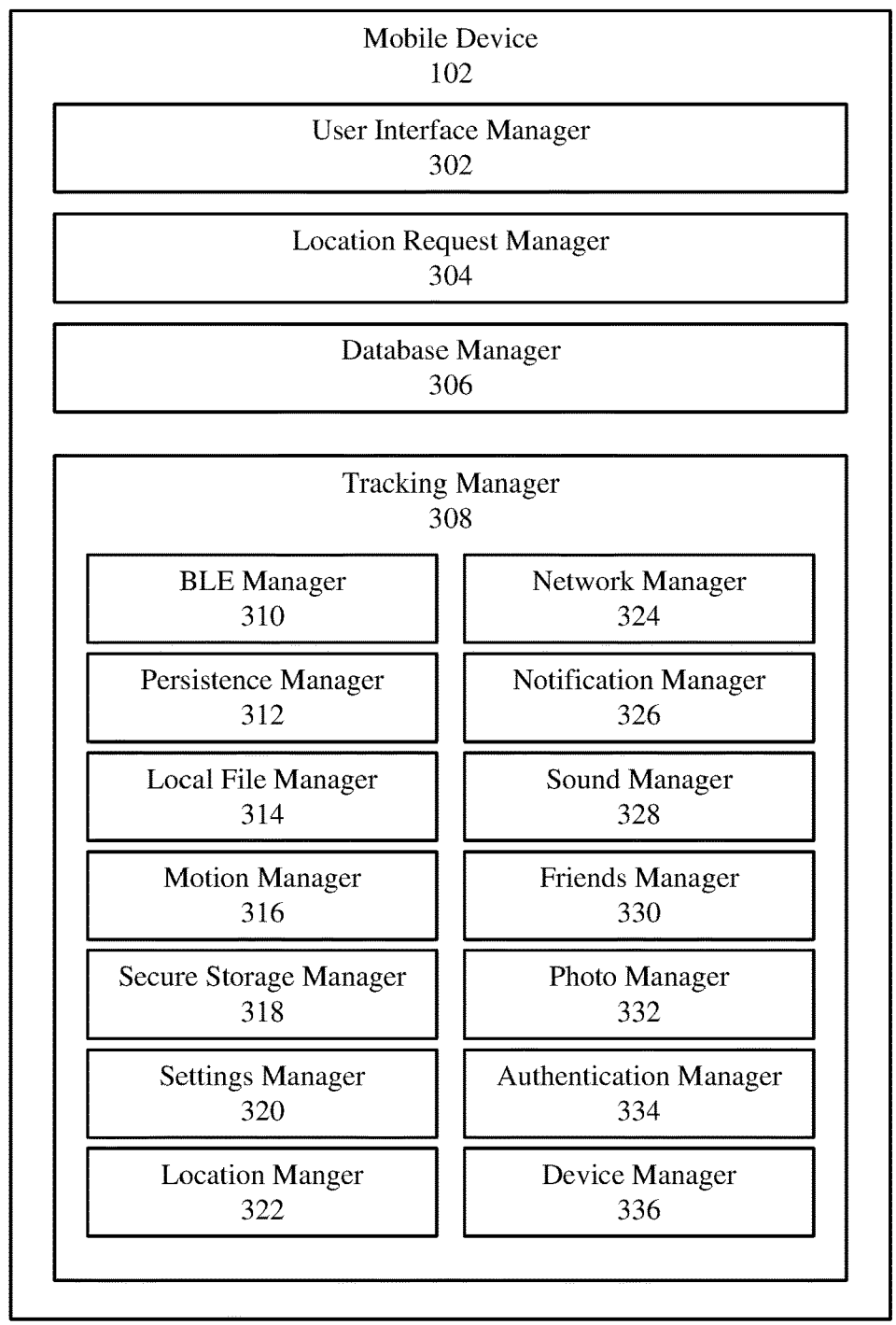
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
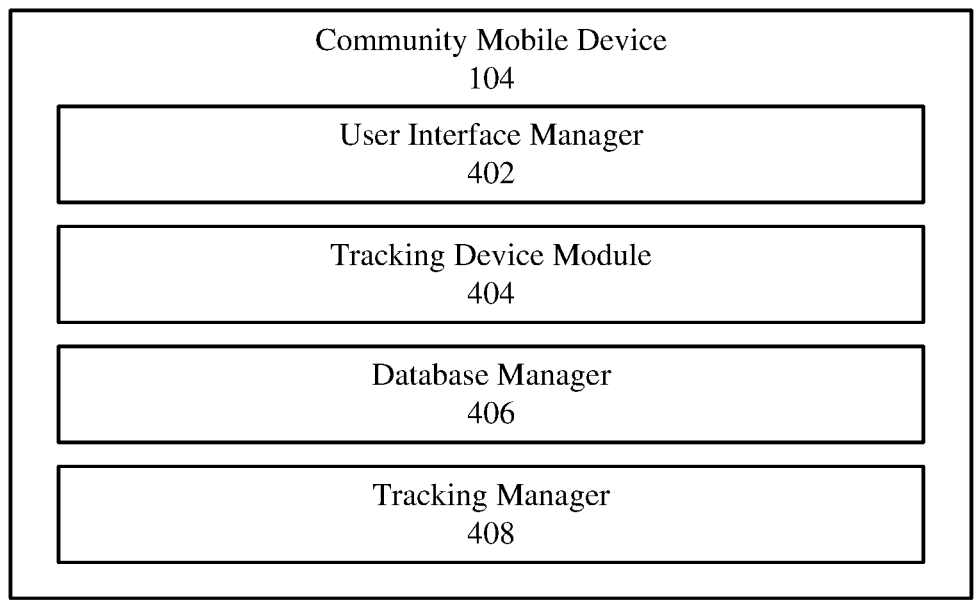
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
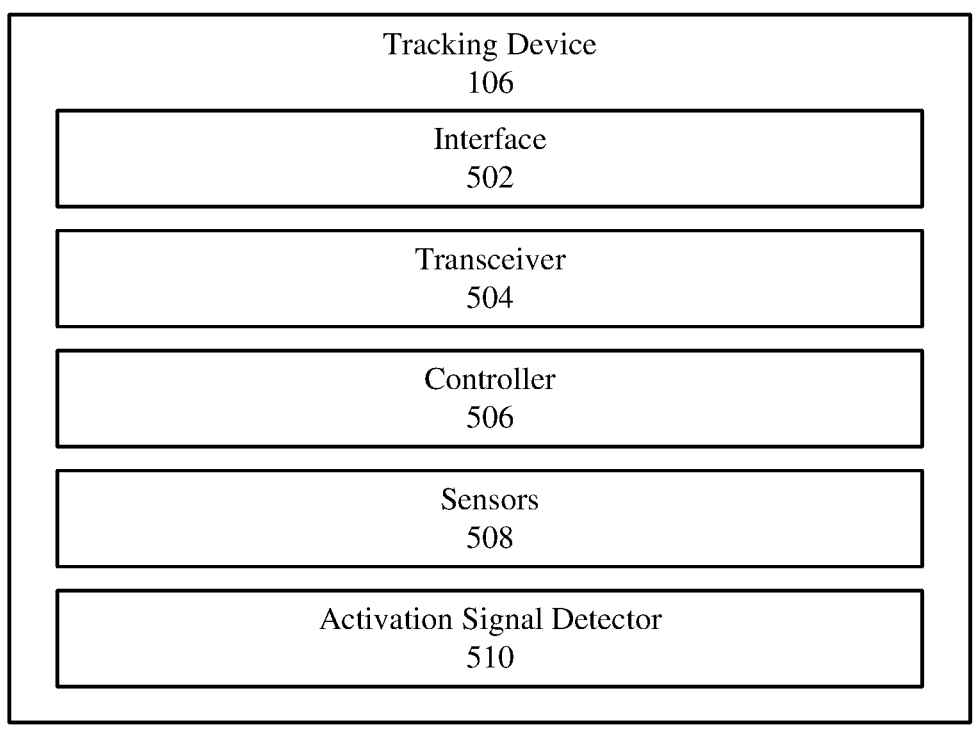
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and an activation signal detector 510. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102 or a preconfiguration system 112. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like). In addition, the interface 502 can, in response to the transceiver 504 receiving signals from the preconfiguration system 112, manage a preconfiguration protocol to establish a communicative connection between the tracking device 106 and the preconfiguration system 112. Similar to the pairing protocol, the preconfiguration protocol can also be a BLE connection or some other suitable wireless connection protocol. The preconfiguration protocol may be the same as the pairing protocol. Alternatively, the preconfiguration protocol and the pairing protocol may be different wireless connection protocols.

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device 106 into a sleep mode or awake mode, can configure the tracking device 106 into a preconfiguration mode, can configure the tracking device 160 into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

The activation signal detector 510 is a device or component that detects the presence of an activation signal in proximity to the tracking device 106 and provides information about the detected activation signal to the controller 506. The controller 506 can configure the tracking device 106 into the preconfiguration mode upon receiving an indication that the activation signal detector 510 detected the activation signal.

In one embodiment, the activation signal detector 510 is a magnetic field detector that provides information about a magnetic field. For example, the activation signal detector 510 may be a hall effect sensor that provides an output voltage based on a magnetic field. In another embodiment, the activation signal detector 510 is a light sensor (e.g., a photoresistor, photodiode, or phototransitor) that provides information about light intensity. Alternatively, the activation signal detector 510 may be a motion detector (e.g., an accelerometer or gyroscope) that provides information about the rotational and/or translational motion of the detector 510. The activation signal detector 510 may also be a sound detector (e.g., a microphone) that provides information about sound waves.

The information sent from the activation signal detector 510 to the controller 506 can be an analog value representing the strength of the detected activation signal (or some other property of the activation signal, such as the signal's frequency or duty cycle), and the controller 506 can configure the tracking device 106 into the preconfiguration mode when the analog value exceeds a threshold value. For example, in an embodiment where the activation signal detector 510 is a hall effect sensor, the information sent to the controller is an output voltage representing the strength of the magnetic field detected by the hall effect sensor, and the controller 506 configures the tracking device 106 to operate in the preconfiguration mode upon receiving an output voltage exceeding a threshold voltage.

The information sent from the activation signal detector 510 to the controller 510 can be a digital value with a value of 0 when the strength (or some other property) of the detected activation signal is below a threshold value and a value of 1 when the strength (or some other property) of the detected activation signal is above a threshold value. In this embodiment, the controller 506 configures the tracking device 106 into the preconfiguration mode when the digital value is 1. For example, in an embodiment where the activation signal detector 510 is a hall effect sensor, the information sent to the controller is a fixed output voltage when the magnetic field detected by the hall effect sensor exceeds a threshold, and the information is an output voltage of zero when the magnetic field is below the threshold.

In some embodiments, in addition to providing information about the detected activation signal, the output of the activation signal detector 510 also provides some or all of the power consumed by the tracking device while operating in the preconfiguration mode. For example, in an embodiment where the activation signal detector 510 is a hall effect sensor, the output voltage of the hall effect sensor may be used to power the tracking device 100 while the tracking device operates in the preconfiguration mode. In other embodiments, the tracking device 100 is powered by a separate power source (e.g., a battery) when operating in the preconfiguration mode. In these embodiments, the same power source may also power the tracking device 100 when operating in the other modes, such as the sleep mode and the awake mode.

Wireless Tracking Device Preconfiguration

After purchasing and receiving a tracking device 106, a user can perform a manual setup process between the tracking device 106 and the mobile device 102 before the tracking device 106 can be used. The manual setup process involves activating a pairing protocol on the tracking device 106 to establish a communicative connection between the tracking device 106 and the mobile device 102 over the second network 110. After the communicative connection is established, the mobile device 102 receives a tracking device identifier from the tracking device 106 and sends the tracking device identifier along with the user's user identifier to the tracking system 100. The tracking system 100 associates the tracking device identifier to the user identifier. After the tracking system 100 associates the tracking device identifier to the user identifier, the tracking device 106 is ready to use and is capable of being located by the user.

This manual setup process can be inconvenient to the user. The user typically has to perform a physical interaction with the tracking device 106 to activate the pairing protocol (e.g., by holding down a physical button on the tracking device 106 for several seconds) and the user may also have to perform several interactions with user interfaces on the mobile device 102 to complete the pairing protocol and to send the tracking device identifier and user identifier to the tracking system 100. Furthermore, multiple tracking devices 106 can be sold to users in a single package in order to encourage users to put tracking devices on several of their important belongings. This means a user who receives a package with several tracking devices 106 must perform this manual setup process separately for each tracking device 106.

Instead of having the user perform a manual setup process after receiving one or more tracking devices 106, a preconfiguration system 112 performs a preconfiguration process on the tracking devices 106 after they are purchased but before they are shipped to the user. As part of the preconfiguration process, the preconfiguration system 112 generates an activation signal that can be detected by the activation signal detector 510 on a tracking device 106. Upon detecting the activation signal, the tracking device 106 is configured to operate in a preconfiguration mode and to implement a preconfiguration protocol to establish a communicative connection with the preconfiguration system 112. The preconfiguration system 112 can then communicate with the tracking device 106 to perform a variety of tasks, including receiving a tracking device identifier from the tracking device 106 so that the tracking device identifier can be associated with the user identifier for the user who purchased the tracking device 106. Because this preconfiguration process can be performed before it is shipped to the user (e.g., at the warehouse that fulfills users' purchases of tracking devices 106), the tracking device 106 is ready to use before it is shipped. As a result, the user does not have to perform the manual setup process after receiving the tracking device.

This preconfiguration process can be performed without removing a tracking device 106 from its packaging because the packaging can be constructed in a manner that allows the activation signal and the communicative connection to pass through the packaging. Furthermore, a single preconfiguration system 112 can perform this preconfiguration process for multiple tracking devices 106 in parallel because the same activation signal can activate multiple tracking devices 106, and the preconfiguration system 112 can establish a communicative connection with multiple tracking devices 106 at once. As a result, this preconfiguration process is especially advantageous for packages containing multiple tracking devices 106 because each tracking device 106 in the package can be preconfigured simultaneously without removing any of the tracking devices 106 from the packaging.

Figure 6A:
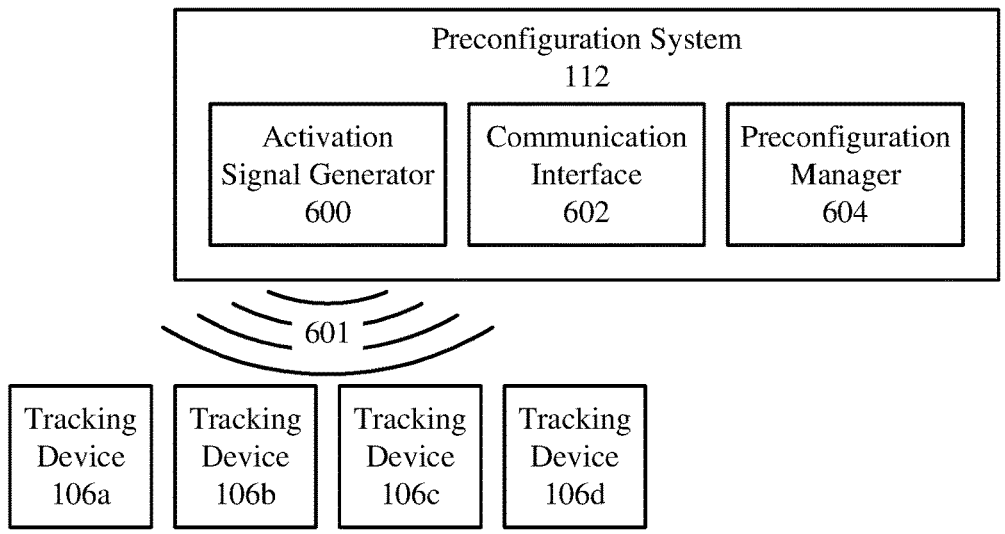
FIGS. 6A-6B illustrate an example system environment for performing wireless tracking device preconfiguration, according to one embodiment.
Figure 6B:
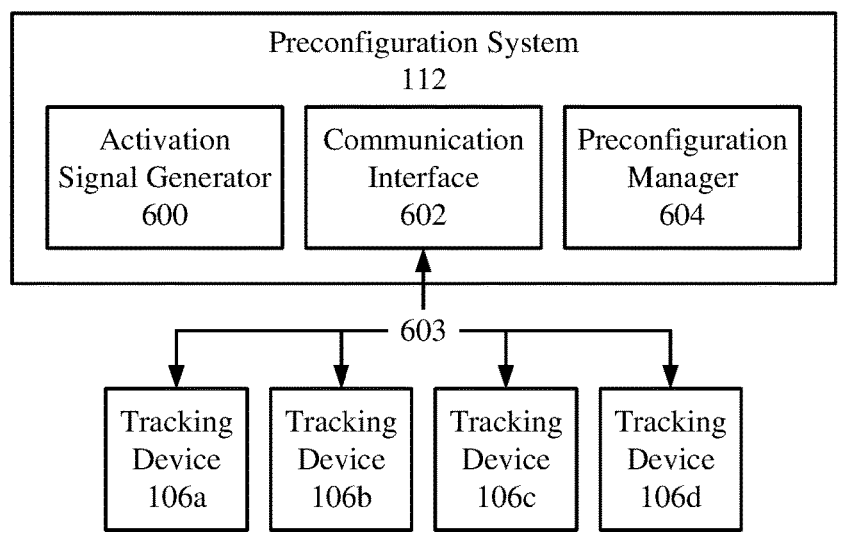

FIGS. 6A and 6B illustrate an example system environment for performing wireless tracking device preconfiguration, according to one embodiment. The system environment illustrated in FIGS. 6A and 6B includes a preconfiguration system 112 that interacts with four tracking devices 106a through 106d (collectively referred to herein as "tracking devices 106"). In one embodiment, the preconfiguration system 112 operates in a warehouse that maintains a stock of tracking devices 106 in sealed packaging and fulfills users' purchases of the tracking devices 106. In another embodiment, the preconfiguration system 112 operates in a retail store that allows customers to purchase tracking device 106 and other products in person. It should be noted that in other embodiments, the system environment includes fewer, additional, or different components than those illustrated in FIG. 6.

Referring first to FIG. 6A, the activation signal generator 600 is a device that generates an activation signal 601 that can be detected by the activation signal detector 510 on each of the tracking devices 106. As noted above, the packaging for the tracking devices 106 can be constructed in a manner that allows the activation signal to permeate the packaging. In an embodiment where the activation signal detector 510 is a magnetic field detector (e.g., a hall effect sensor), the activation signal generator 600 is a magnetic field generator (e.g., an electromagnet) and the packaging is constructed to allow a magnetic field to pass through the packaging (e.g., the packaging may be constructed primarily with cardboard or plastic).

In an embodiment where the activation signal detector 510 is a light detector, the activation signal generator 600 is a light generator and the packaging has a transparent portion that exposes the activation signal detector 510 to external light sources. Alternatively, if the activation signal detector 510 is a motion detector, then the activation signal generator 600 is a device that subjects tracking devices 106 to motion (e.g., acceleration or rotation), and the packaging has an internal structure that holds the tracking devices 106 in place to prevent them from moving relative to the packaging. Thus, when the packaging is subjected to motion, the tracking devices 106 inside the packaging are subject to similar motion. If the activation signal detector 510 is a sound detector, then the activation signal generator 600 is a sound generator (e.g., a speaker), and a portion of the packaging is made of a material that allows sound waves to pass through the packaging.

The activation signal generator 600 causes any tracking devices 106 in range of the activation signal 601 (e.g., within a threshold distance) to be configured to operate in the preconfiguration mode. As referred to herein, a tracking device 106 and an activation signal generator 600 are said to be in proximity to each other if the tracking device 106 is within the range of the activation signal 601. Although the system environment is shown in FIGS. 6A and 6B with four tracking devices 106, the number of tracking devices shown in FIGS. 6A and 6B is merely exemplary. In real-world use, different numbers of tracking devices 106 may be placed in proximity to the activation signal generator 600 for activation.

Referring next to FIG. 6B, the communication interface 602 establishes a communicative connection 603 with the interface 502 of one or more the tracking devices 106 after the tracking devices 106 have been configured to operate in the preconfiguration mode. For instance, the communicative connection 603 can be a Bluetooth Low Energy (BLE) connection or some other suitable wireless connection protocol.

The preconfiguration manager 604 interacts with the activation signal generator 600, the communication interface 602, and devices/systems connected to the preconfiguration system 112 to activate tracking devices 106 and perform a variety of tasks while the tracking devices 106 are operating in the preconfiguration mode. For example, the preconfiguration manager 604 can receive tracking device identifiers from the connected tracking devices 106 and send the tracking device identifiers, along with a user identifier for the purchasing user, to the tracking system 100 so that the tracking system 100 can associate the tracking device identifiers with the user identifier. This process is described in further detail below. As another example, the preconfiguration manager 604 can send a firmware update to the connected tracking devices 106. As still another example, the preconfiguration manager 604 can operate a testing process on the connected tracking devices 106 to verify that the tracking devices 106 are functioning properly. For instance, the preconfiguration manager 604 may send a testing process to each connected tracking device 106, and the tracking device 106 may be configured to execute the testing process (e.g., on the controller 506) and send results of the testing process to the preconfiguration system 112 over the communicative connection 603. The preconfiguration manager 604 can also verify the battery status of the tracking devices 106. This may be useful, for example, in situations where the tracking devices 106 have been stored in a warehouse for an extended period of time after being manufactured and before being shipped to a user.

The preconfiguration manager 604 may perform a combination of these tasks (or other tasks not described above) while the tracking devices 106 are configured to operate in the preconfiguration mode and are connected over the communicative connection 603. For example, after a user has purchased a package of tracking devices 106, the preconfiguration manager 604 performs the association process for the tracking devices, applies the most recent firmware update to the tracking devices, and performs a testing process, and the tracking devices 106 are shipped to the user after the preconfiguration manager 604 has successfully completed all three tasks.

The preconfiguration manager 604 may also perform some or all of these tasks separately each time the tracking devices 106 are connected over the communicative connection 603. For example, the preconfiguration manager 604 may apply a firmware update to a large quantity of unpurchased tracking devices 106 without performing an association process or testing process. As another example, the preconfiguration manager 604 may perform a testing process on a group of unpurchased tracking devices 106 selected by the manufacturer of the tracking devices 106. This may be useful, for instance, in a situation where the manufacturer detects an error during the manufacturing process for that group of tracking devices 106 and wishes to verify that the error did not compromise the functionality of the tracking devices 106.

Figure 7:
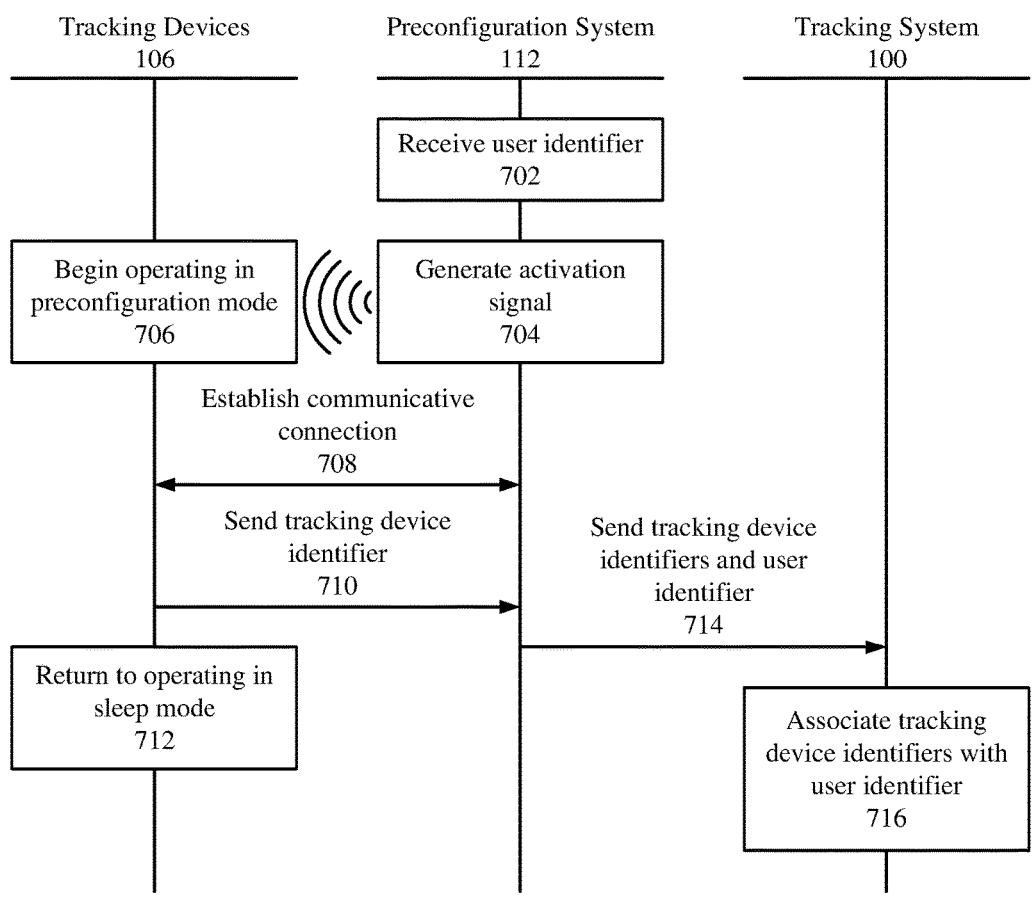
FIG. 7 is an interaction diagram illustrating an example method for wireless tracking device preconfiguration, according to one embodiment.

FIG. 7 is an interaction diagram illustrating an example method for wireless tracking device preconfiguration, according to one embodiment. The method illustrated in FIG. 7 may occur, for instance, after a user purchases one or more tracking devices 106. In other embodiments, the method shown in FIG. 7 may include additional, fewer, or different steps, and the steps shown in FIG. 7 may be performed in a different order.

The preconfiguration system 112 receives 702 a user identifier, for instance after the user purchases one or more tracking devices 106. As referred to herein, a user identifier uniquely identifies a user of the tracking system 100. For example, a user identifier may be a username or email address that the user provides in order to access the tracking system 100. Alternatively, a user identifier may be a value generated by the tracking system 100, such as a number or a string of characters.

A system external to and separate from the preconfiguration system 112 can facilitate a purchase of the tracking device 106 (e.g., the tracking system 100, a separate retail system operated by the same organization that operates the tracking system 100, or a system operated by a third-party retailer) and the preconfiguration system 112 receives 702 the user identifier from the external system. For example, in an embodiment where the user's username or email address is the user identifier, the user may be prompted to provide his or her user identifier (in the form of a username or email address) as part of the process for making the purchase, and the system facilitating the purchase provides the user identifier to the preconfiguration system 112. In addition to the user identifier, the preconfiguration system 112 may also receive information about the user's purchase, such as the number of tracking devices 106 or the number of packages of tracking devices 106 the user has purchased and the user's shipping address.

A number of tracking devices 106 (i.e., the number of tracking devices that the user purchased) is placed in proximity to the activation signal generator 600, and the preconfiguration system 112 generates 704 an activation signal that configures the tracking devices 106 to begin operating 706 in a preconfiguration mode. More particularly, each tracking device 106 initially operates in a sleep mode (i.e., before being exposed to the activation signal). When the activation signal detector 510 on a tracking device 106 detects the activation signal, the activation signal detector 510 sends information about the activation signal to the controller 506. Upon receiving information indicating that the activation signal is present, the controller 506 of the tracking device 106 configures the tracking device 106 to stop operating in the sleep mode and begin operating in the preconfiguration mode.

After the tracking devices 106 begin operating 706 in the preconfiguration mode, the controller 506 of each tracking device 106 establishes 708 a communicative connection with the communication interface 602 of the preconfiguration system 112 (e.g., via the transceiver 504 and the interface 502). In one embodiment, the preconfiguration system 112 establishes a Bluetooth Low Energy (BLE) connection with each tracking device 106.

After the communicative connections are established 708 with the tracking devices 106, each tracking device sends 710 a tracking device identifier to the preconfiguration system 112 over the communicative connection. As referred to herein, a tracking device identifier uniquely identifies a tracking device 106 to the tracking system 100. For example, the tracking device identifier may be a serial number for the tracking device 106. In one embodiment, the controller 506 on each tracking device 106 is configured to automatically send 710 the tracking device identifier after the communicative connection is established. In another embodiment, the preconfiguration system 112 first sends a command to the tracking device 106 to send its tracking device identifier, and the controller 506 sends 710 the tracking device identifier in response to receiving this command.

Apart from sending the tracking device identifier, each tracking device 106 may optionally perform one or more additional tasks involving communication over the communicative connection, such as receiving and installing a firmware update or operating a testing process. After any such tasks have been completed, the tracking devices 106 return to operating 712 in sleep mode. In one embodiment, the controller 506 on each tracking device 106 automatically configures the tracking device 106 to return to sleep mode if no communications have been received over the communicative connection for a predetermined time interval (e.g., 60 seconds). In another embodiment, the preconfiguration system 112 sends a command to each tracking device 106 over the communicative connection to return to sleep mode. Once the tracking devices 106 have returned to operating 712 in sleep mode, they may be shipped to the user.

After receiving the tracking device identifiers, the preconfiguration system 112 sends the tracking device identifiers and the user identifier to the tracking system 100. The tracking system 100 associates 716 the tracking device identifiers with the user identifier.

Wirelessly preconfiguring one or more tracking devices 106 is advantageous for several reasons. First, by associating 716 the tracking device identifiers with the user identifier within a tracking system 100, the tracking devices 106 are ready to use when received by a user; as a result, the user does not have to perform the manual setup process upon receiving the tracking devices 106, and the user can also use the tracking functions of the tracking system 100 and tracking devices 106 described above while the tracking devices are being shipped to the user. Second, the method can preconfigure multiple tracking devices 106 simultaneously because a single activation signal can configure multiple tracking devices 106 to begin operating in the preconfiguration mode, and a single preconfiguration system 112 can establish communicative connections with multiple tracking devices 106 at once. Therefore, each tracking device 106 in a packaging containing multiple tracking devices 106 can be preconfigured simultaneously. Third, because the packaging for the tracking devices 106 can be constructed to allow the activation signal and the communicative connections to pass through the packaging, the method can be performed without removing the tracking devices 106 from the packaging.

The controller 506 of each tracking device 106 can be configured to ignore the information received from the activation signal detector 510 after each tracking device is preconfigured (e.g., through a command sent by the preconfiguration system 112 over the communicative connection). This can be advantageous because the activation signal detector 510 may continue to function after the method is completed, and the controller 506 may otherwise mistakenly recognize background noise detected by the activation signal detector 510 as an activation signal. For example, in an embodiment where the activation signal detector 510 is a hall effect sensor, the hall effect sensor continues to provide an output voltage to the controller 510 based on the magnetic field detected by the sensor. Thus, if the controller 510 is not configured to ignore the output of the hall effect sensor, the controller may mistake a particularly strong background magnetic field for the activation signal and cause the tracking device 106 to begin operating in the preconfiguration mode.

In another embodiment, instead of being configured to ignore the information received from the activation signal detector 510, the controller 506 is configured to recognize a particular activation signal that is unlikely to occur in background noise (e.g., a sequence of pulses at a particular frequency, magnitude, and duty cycle). This advantageously allows a tracking device to enter preconfiguration mode any time the activation signal is detected. For instance, the preconfiguration method described in FIG. 7 can be performed when a tracking device 106 is purchased. If the tracking device 106 is later returned to the manufacturer (e.g., to be recycled), the manufacturer can expose the tracking device 106 to a second activation signal to cause the tracking device to enter the preconfiguration mode, receive the tracking device's identifier, and send the identifier to the tracking system 100 to be disassociated from the user's identifier.

The method illustrated in FIG. 7 was described with reference to an embodiment where the preconfiguration system 112 operates in a warehouse that fulfills purchases of tracking devices 106. In another embodiment, the method is performed at a different location after the tracking devices 106 have been shipped from the warehouse. For example, purchased tracking devices 106 are first shipped to a facility operated by the same entity that operates the tracking system 100, and the tracking devices 106 undergo the preconfiguration method via a preconfiguration system 112 at this facility before being shipped to the purchasing user. This may allow the tracking system and the preconfiguration system 112 to be implemented as a single system while still allowing for third-party distributors to fulfill purchases of tracking devices 106.

In still another embodiment, the preconfiguration system 112 is a computing device that operates in a retail store that allows users to purchase tracking devices 106 in person. In this embodiment, the preconfiguration system 112 may receive 702 the user identifier as input from the purchasing user. For example, the preconfiguration system 112 may include a user interface that prompts a user for the login information that he or she uses to access the tracking system 100 (e.g., a username or email address for the user). The interface may then instruct the user to place a package of tracking devices 106 that he or she has purchased (or intends to purchase) on a surface near an activation signal generator 600, and the preconfiguration method takes place after the package of tracking devices 106 is placed on the surface. After the method is completed and the tracking devices 106 have returned to operating in sleep mode, the interface informs the user that he or she can remove the package from the surface and begin using the tracking devices 106.

Additional Considerations

Although the foregoing description was provided with respect to tracking devices 106, similar components and methods can be used to preconfigure other types of electronic devices. For example, a mobile computing device such as a smartphone, tablet computer, or laptop computer may include an activation signal detector coupled to a controller that is capable of configuring the mobile computing device to operate in a preconfiguration mode. While in the preconfiguration mode, the controller interacts with an interface on the mobile computing device to establish a communicative connection with a preconfiguration system, and the preconfiguration system can then perform a variety of preconfiguration tasks on the mobile computing device.

For example, similar to the method described with reference to FIG. 7, the preconfiguration system can receive a device identifier from the mobile computing device and send the device identifier and an identifier for the user who purchased the device to a server configured to associate the device identifier with the user identifier. This may be useful, for example, if the server operates an anti-theft service that allows the user to designate the device as lost (and send a command to the device to begin operating in a reduced functionality mode) if it is lost during the shipping process, or if the server allows the user to remotely track the location of the device (e.g., if the device is a smartphone or tablet computer with a GPS receiver or some other sort of location module).

As another example, the preconfiguration system could send a software or firmware update to the mobile computing device. As still another example, the preconfiguration system can personalize the software on the computing device (e.g., by creating an account on the device's operating system for the user, adjusting certain settings of the operating system, pre-loading certain applications, or removing certain applications that are pre-loaded by default).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A tracking device, comprising:
   a hall effect sensor configured to, when the tracking device is configured to operate in a sleep mode, detect a magnetic field and produce an output voltage based on a strength of the magnetic field;
   a communication interface configured to establish a communicative connection with a preconfiguration system; and
   a controller coupled to the hall effect sensor and the communication interface, the controller configured to:
      responsive to receiving, from the hall effect sensor, an output voltage exceeding a threshold voltage, configure the tracking device to operate in a preconfiguration mode,
      when configured to operate in the preconfiguration mode, establish the communicative connection with the preconfiguration system via the communication interface,
      provide a tracking device identifier uniquely identifying the tracking device over the communicative connection to the preconfiguration system, the preconfiguration system configured to associate the tracking device identifier with a user account, and
      responsive to providing the tracking device identifier to the preconfiguration system, configure the tracking device to operate in the sleep mode.

2. The tracking device of claim 1, further comprising a battery coupled to the controller and configured to provide power to the controller when the controller is configured to operate in the preconfiguration mode.

3. The tracking device of claim 1, wherein the output voltage of the hall effect sensor provides power to the controller when the controller is configured to operate in the preconfiguration mode.

4. The tracking device of claim 1, wherein the controller, when configured to operate in the preconfiguration mode, is further configured to:
   receive a firmware update for tracking device over the communicative connection; and
   apply the firmware update to the tracking device.

5. The tracking device of claim 1, wherein the controller, when configured to operate in the preconfiguration mode, is further configured to:
   perform a testing process on the tracking device, the performance of the testing process comprising one or more communications with the preconfiguration system over the communicative connection, the communications comprising providing a result of the testing process to the preconfiguration system.

6. A method for preconfiguring a tracking device, comprising:
   detecting, at a hall effect sensor of the tracking device while the tracking device is configured to operate in a sleep mode, a magnetic field;
   producing, by the hall effect sensor, an output voltage based on a strength of the detected magnetic field;
   in response to the output voltage exceeding a threshold voltage, configuring, by a controller of the tracking device, the tracking device to operate in a preconfiguration mode;
   when configured to operate in the preconfiguration mode, establishing, via a communication interface of the tracking device, a communicative connection with a preconfiguration system;
   providing, by the controller of the tracking device, a tracking device identifier uniquely identifying the tracking device over the communicative connection to the preconfiguration system; and
   in response to providing the tracking device identifier, configuring, by the controller of the tracking device, the tracking device to operate in the sleep mode.

7. The method of claim 6, further comprising:
   when configured to operate in the preconfiguration mode, receiving a firmware update for tracking device over the communicative connection; and
   applying the firmware update to the tracking device.

8. The method of claim 6, further comprising:
   when configured to operate in the preconfiguration mode, performing a testing process on the tracking device, the performing of the testing process comprising one or more communications with the preconfiguration system over the communicative connection, the communications comprising providing a result of the testing process to the preconfiguration system.

9. A preconfiguration system for preconfiguring a tracking device, comprising:
   an activation signal generator configured to generate a wireless activation signal in proximity to the tracking device, the tracking device having an activation signal detector coupled to a controller, wherein the controller is configured to reconfigure the tracking device from a sleep mode to a preconfiguration mode responsive to the activation signal detector detecting the activation signal;
   a communication interface configured to establish a communicative connection with the tracking device when the tracking device is operating in the preconfiguration mode; and
   a preconfiguration manager configured to:
      receive, from a central tracking system, a user identifier of an owner of the tracking device,
      receive, from the communication interface over the communicative connection, a tracking device identifier uniquely identifying the tracking device, and provide the tracking device identifier and the user identifier to the central tracking system, the central tracking system configured to associate the tracking device identifier with the user identifier.

10. The preconfiguration system of claim 9, wherein the wireless activation signal comprises a magnetic field having a strength above a threshold strength.

11. The preconfiguration system of claim 9, wherein the wireless activation signal is a light flash.

12. The preconfiguration system of claim 9, wherein the wireless activation signal is physical motion.

13. The preconfiguration system of claim 9, wherein the wireless activation signal is a sound.

14. The preconfiguration system of claim 9, wherein the central tracking system is further configured to, prior to associating the tracking device identifier with the user identifier, determine whether the tracking device identifier is associated with a different user identifier.

15. The preconfiguration system of claim 9, wherein the tracking device is inside a sealed package containing a plurality of tracking devices, wherein the activation signal generator generates the wireless activation signal in proximity to the plurality of tracking devices inside the package, wherein the user identifier identifies the owner of each of the plurality of tracking devices, and wherein the preconfiguration manager is further configured to:
  receive, from the communication interface over the communicative connection, a plurality of tracking device identifiers, each of the plurality of tracking device identifier received from one of the plurality of tracking devices; and
  provide the plurality of tracking device identifiers to the central tracking system, the central tracking system configured to associate each of the plurality of tracking device identifiers with the user identifier.

16. The preconfiguration system of claim 9, wherein the preconfiguration manager is further configured to provide a firmware update to the tracking device over the communicative connection.

17. The preconfiguration system of claim 9, wherein the preconfiguration manager is further configured to operate a testing process on the tracking device over the communicative connection, the operation of the testing process comprising receiving a result of the testing process from the tracking device over the communicative connection.

18. A method for preconfiguring a tracking device, comprising:
  receiving, at a preconfiguration system from a central tracking system, a user identifier of an owner of the tracking device;
  generating a wireless activation signal in proximity to the tracking device, the tracking device having an activation signal detector coupled to a controller, wherein the controller is configured to reconfigure the tracking device from a sleep mode to a preconfiguration mode responsive to the activation signal detector detecting the activation signal;
  establishing, by a communication interface of the preconfiguration system, a communicative connection with the tracking device when the tracking device is operating in the preconfiguration mode;
  receiving, over the communicative connection, a tracking device identifier uniquely identifying the tracking device; and
  providing the tracking device identifier and the user identifier to the central tracking system, the central tracking system configured to associate the tracking device identifier with the user identifier.

19. The method of claim 18, wherein generating the wireless activation signal comprises generating a magnetic field with a magnitude greater than a threshold magnitude.

20. The method of claim 18, wherein generating the wireless activation signal comprises generating an emission of light.

21. The method of claim 18, wherein generating the wireless activation signal comprises subjecting the tracking device to a physical motion.

22. The method of claim 18, wherein generating the wireless activation signal comprises generating an audio signal.

23. The method of claim 18, wherein the central tracking system is further configured to, prior to associating the tracking device identifier with the user identifier, determine whether the tracking device identifier is associated with a different user identifier.

24. The method of claim 18, wherein the tracking device is inside a sealed package containing a plurality of tracking devices, wherein the wireless activation signal is generated in proximity to the plurality of tracking devices inside the package, wherein the user identifier identifies the owner of each of the plurality of tracking devices, and further comprising:
  receiving a plurality of tracking device identifiers, each of the plurality of tracking device identifiers received from one of the plurality of tracking devices; and
  providing the plurality of tracking device identifiers to the central tracking system, the central tracking system configured to associated each of the plurality of tracking device identifiers with the user identifier.

25. The method of claim 18, further comprising providing a firmware update to the tracking device over the communicative connection.

26. The method of claim 18, further comprising operating a testing process on the tracking device over the communicative connection, the operation of the testing process comprising receiving a result of the testing process from the tracking device over the communicative connection.

* * * * *